No. 835,017. PATENTED NOV. 6, 1906.
T. W. EVERSOLE.
SELF HEATING SOLDERING IMPLEMENT.
APPLICATION FILED OCT. 25, 1905.
4 SHEETS—SHEET 1.
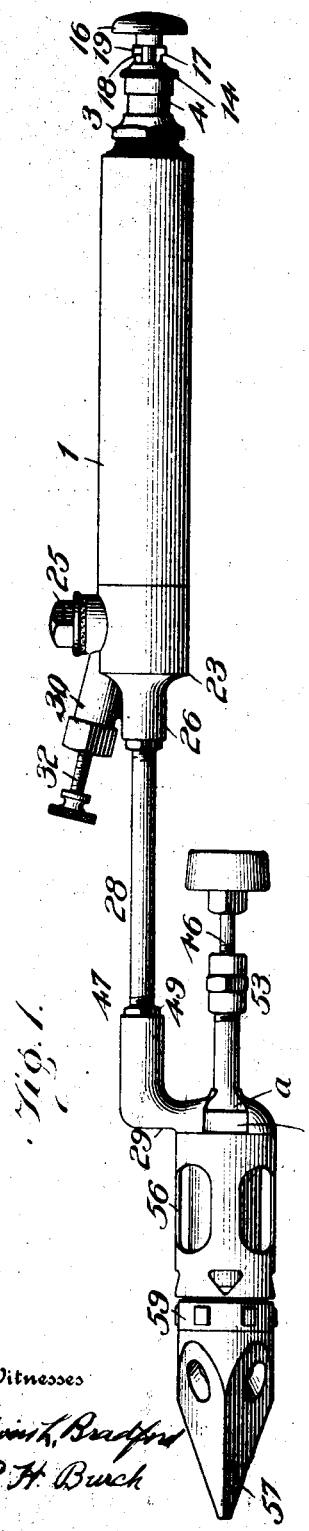
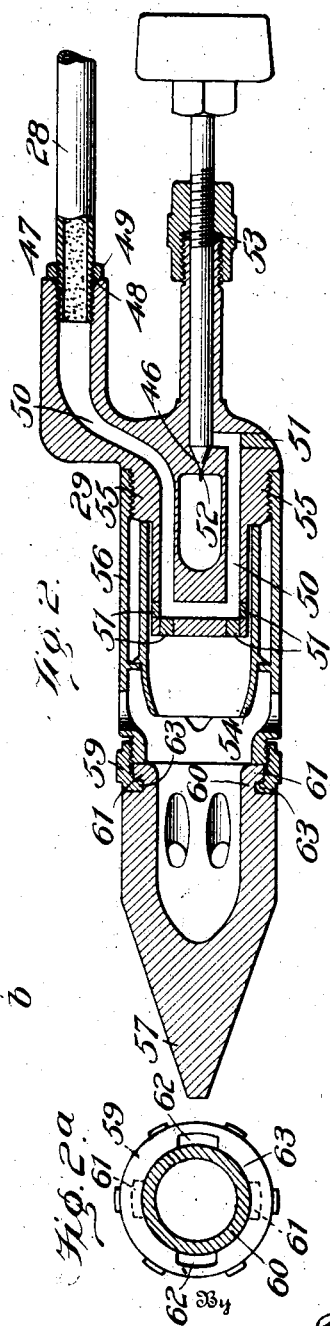
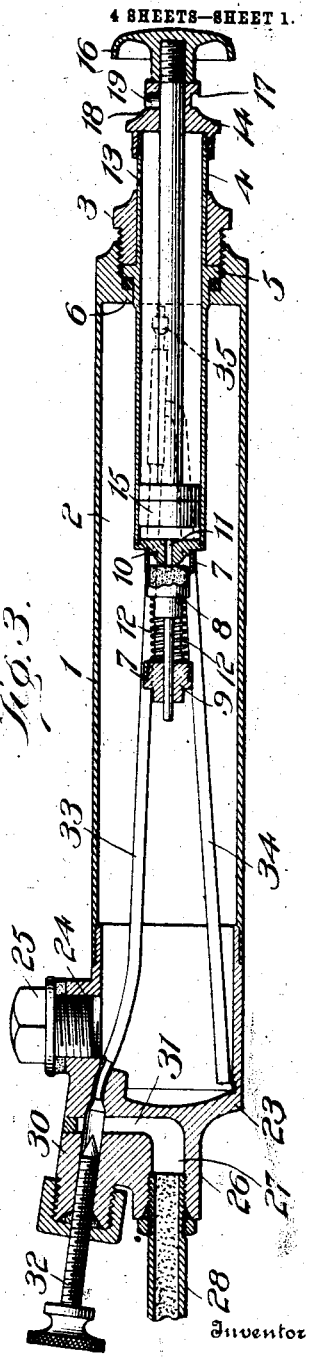
Witnesses
Inventor
T. W. Eversole
J. R. Nottingham
Attorney

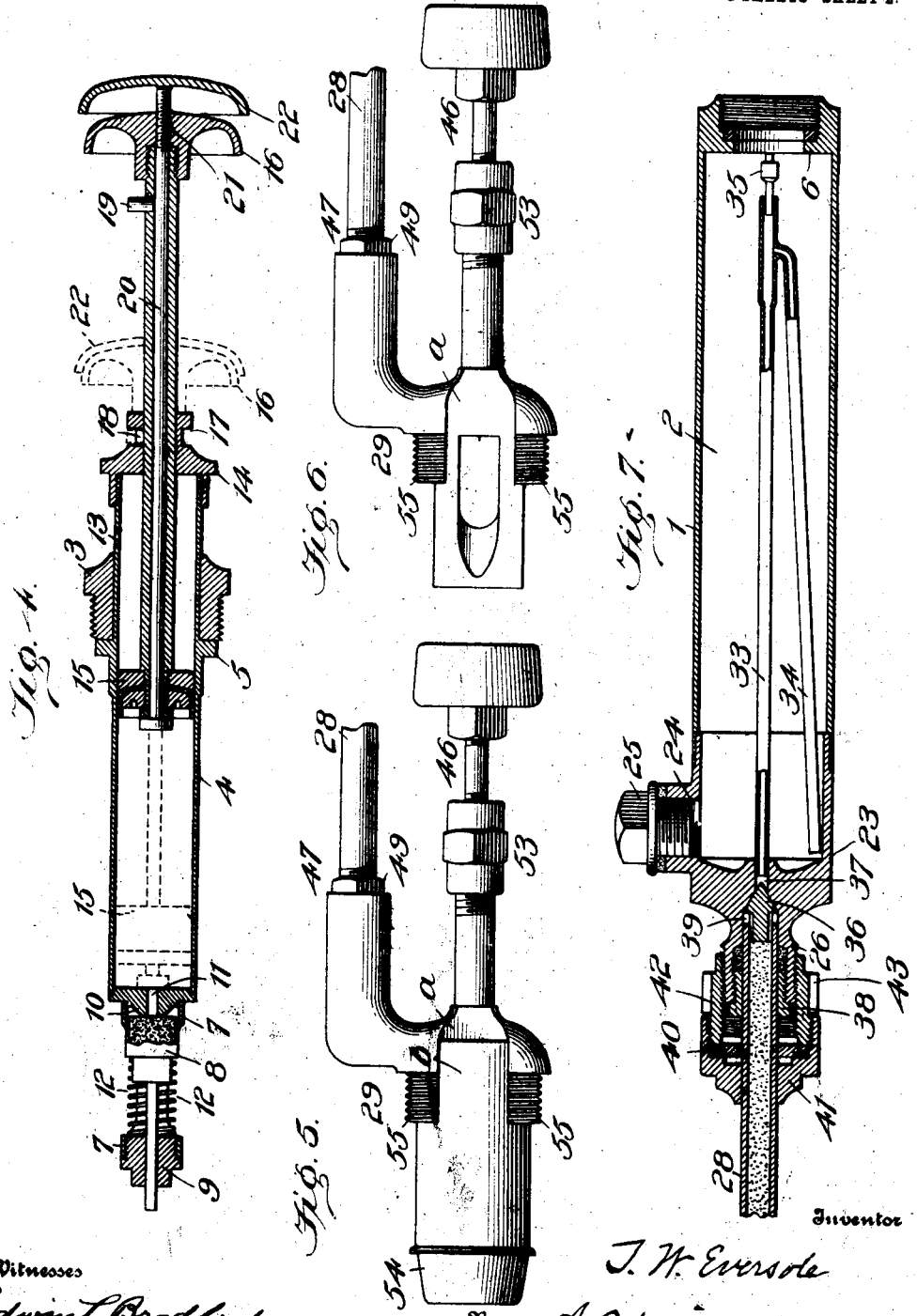

No. 835,017. PATENTED NOV. 6, 1906.
T. W. EVERSOLE.
SELF HEATING SOLDERING IMPLEMENT.
APPLICATION FILED OCT. 25, 1905.
4 SHEETS—SHEET 3.
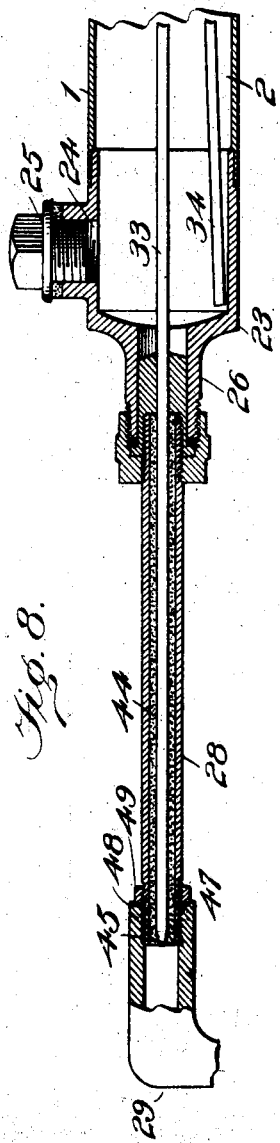
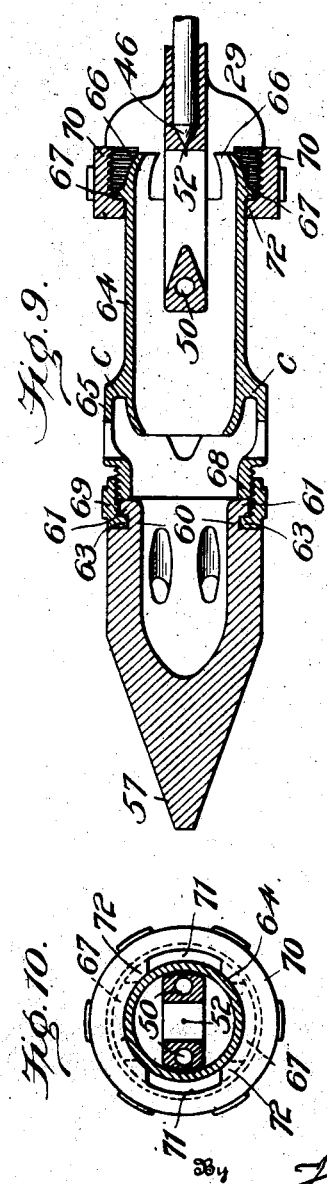
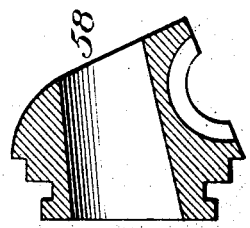
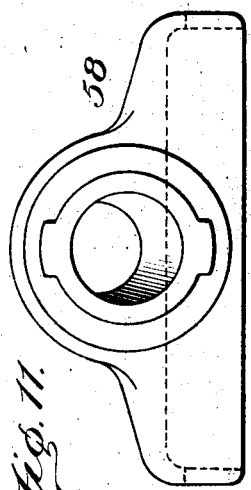
Witnesses
Edwin L. Bradford
P. H. Burch
Inventor
T. W. Eversole
By J. R. Nottingham
Attorney No. 835,017. PATENTED NOV. 6, 1906.
T. W. EVERSOLE.
SELF HEATING SOLDERING IMPLEMENT.
APPLICATION FILED OCT. 25, 1905.
4 SHEETS—SHEET 4.
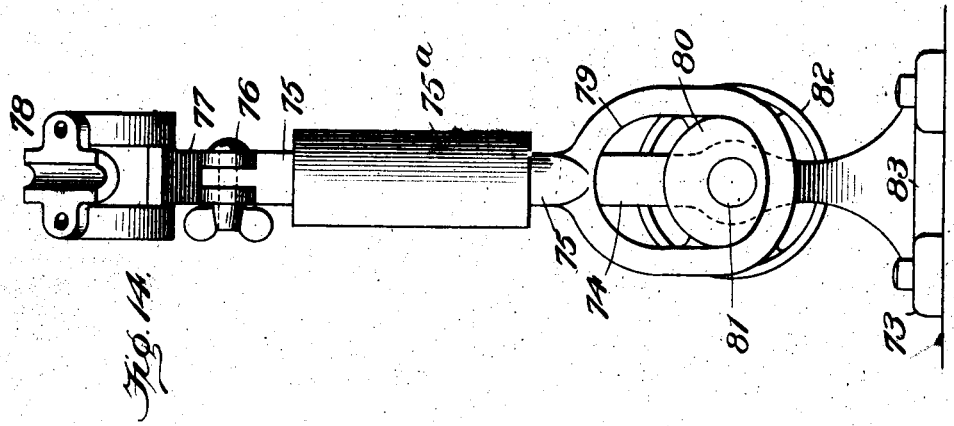
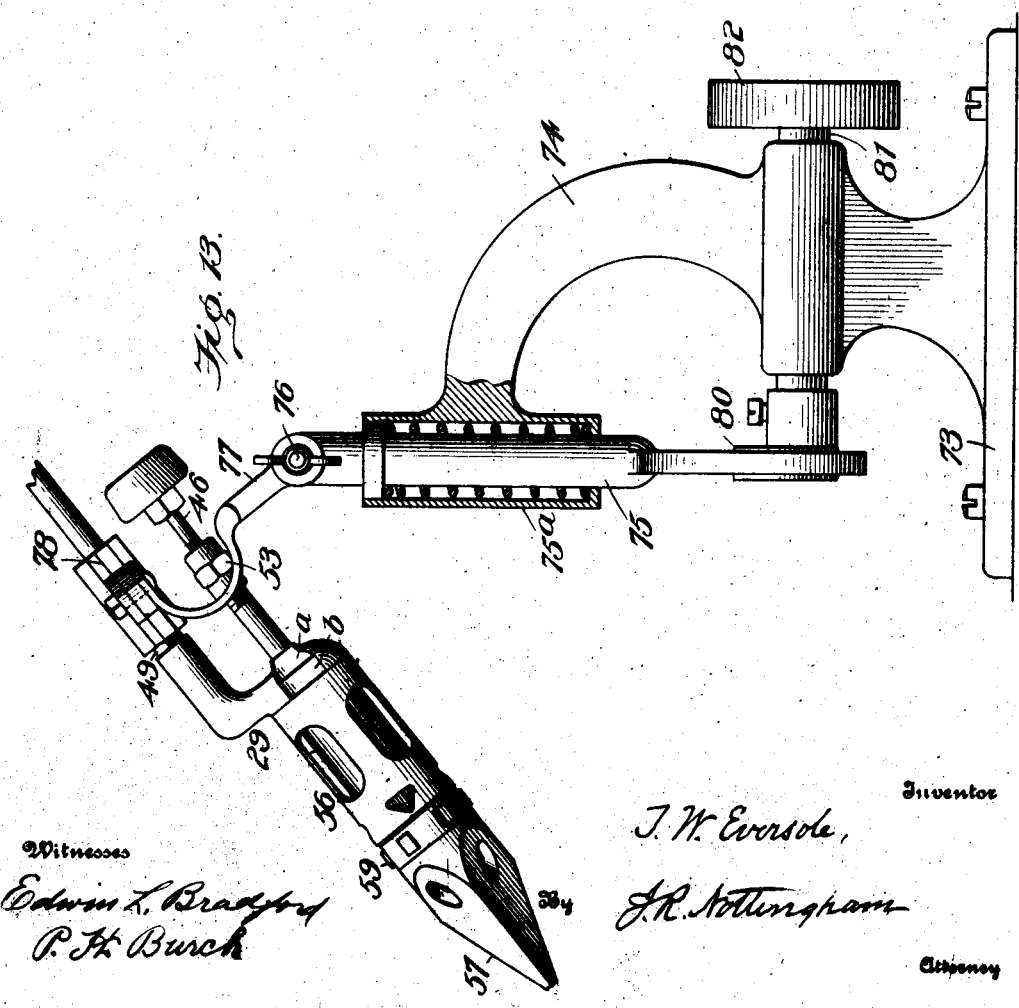

UNITED STATES PATENT OFFICE.

THEODORE W. EVERSOLE, OF WASHINGTON, DISTRICT OF COLUMBIA.

SELF-HEATING SOLDERING IMPLEMENT.

No. 835,017.  Specification of Letters Patent.  Patented Nov. 6, 1906.

Application filed October 25, 1905. Serial No. 284,334.

*To all whom it may concern:*

Be it known that I, THEODORE W. EVERSOLE, a citizen of the United States, residing at Washington, in the District of Columbia, have invented certain new and useful Improvements in Self-Heating Soldering Implements; and I do hereby declare the following to be a full, clear, and exact description of the invention, such as will enable others skilled in the art to which it appertains to make and use the same.

My invention relates to that class of self-heating soldering implements in which the fuel to be employed is gasolene or a similar volatile fluid supplied from a reservoir which forms the handle of the implement.

The principal objects of the invention are, first, to provide for a supply of fuel to the burner in whatever position the implement may be held or supported; second, to so construct the burner that an interchange of soldering tools or points may be provided for, and, third, the adaptation of the implement for use as a paint-breamer or as a torch for heating purposes when used in connection with a suitable heater. These and other objects of the invention are attained by means of the mechanism illustrated in the accompanying drawings, in which—

Figure 1 is a side elevation of my improved implement; Fig. 2, a central longitudinal section, somewhat enlarged, of the burner and soldering tool or point; Fig. 2ª, a plan view of the collar or ring for coupling the tool or point to the burner-shield; Fig. 3, a central longitudinal section, somewhat enlarged, of the fuel-reservoir and the air-pump; Fig. 4, a similar section of a modified form of air-pump; Fig. 5, a side elevation of the burner, the shield or hood being removed; Fig. 6, a similar view, the shield or hood and nozzle being removed; Fig. 7, a central longitudinal section of the fuel-reservoir, showing a modification of the fuel-feed pipe and the valve for controlling the feed of the fuel to the supply-pipe; Fig. 8, another modification of the same; Fig. 9, a longitudinal section of a modified form of shield or hood and nozzle, the two being combined in one; Fig. 10, a plan view, partly in section, of the collar or ring for attaching the combined shield and nozzle to the burner; Fig. 11, a side elevation of a tool or point for soldering electric wires; Fig. 12, a central transverse section of the same; Fig. 13, a side elevation of a support for mechanically operating the implement, and Fig. 14 a front elevation of the same.

Referring to the several views, the numeral 1 indicates a tubular handle, which constitutes a reservoir 2 for the volatile liquid fuel. The rear or outer end of the reservoir is closed by a screw-threaded plug 3, having a central bore through which projects the outer end of a pump-barrel 4. The pump-barrel near its outer end is provided with a flanged collar 5, and the interior of the reservoir is provided with an annular shoulder 6, a suitable packing being placed between said collar and shoulder to provide a fluid-tight connection.

The inner end of the pump-barrel is provided with a reduced extension 7, in which is arranged a spring-pressed valve 8, the stem of which passes through a screw-threaded closure-plug 9. The valve-head is preferably composed of cork in order to better resist the action of the fluid fuel; but any suitable material may be employed. The rear end of the extension is provided with a head or plug 10, which is secured in the front end of the pump-barrel and is provided with an air-delivery port 11, said port being normally closed by the valve 8. The reduced extension is provided with oppositely-disposed air-exits 12 12, and the outer end of the pump-barrel is provided with an air-inlet 13.

The outer end of the pump-barrel is externally screw-threaded and is closed by a screw-threaded head or cap 14, said cap being provided with a central bore through which the piston-rod of a piston 15 is adapted to operate. The outer end of the piston-rod is provided with a knob 16, by means of which the piston may be operated. The head or cap 14 is formed with a semicircular boss 17, having a slot 18, and the piston-rod carries a pin 19, adapted to engage said slot to lock the piston at the end of its inward stroke when desired by giving the knob a slight turn.

To insure absolute safety against possible leakage of the valve 8, which sometimes occurs when the valve is made of a material liable to be corroded by the gasolene, I prefer to make the piston-rod tubular and insert therein a headed stem 20, as shown in Fig. 4. In this form the outer end of the stem is screw-threaded and works through an opening 21 in the knob 16, said stem being also provided with a knob 22. It will be obvious that by manipulating the stem 20 by its knob the delivery-port 11 may be closed on the inside independent of the valve 8 or in conjunction therewith, thus absolutely preventing leakage.

The other end of the reservoir is closed by a head 23, having a filling-orifice 24, closed by a screw-threaded plug 25, and is provided with a central hub 26, having an internally-screw-threaded chamber 27, into which is screwed a supply-pipe 28, leading to the burner 29. The head 23 is provided at one side with a casing 30, which is in communication with the chamber 27 by means of a duct 31, controlled by a valve 32. Leading from the inner end of the casing-chamber which opens into the head 23 is a main fuel-feed pipe 33, having a branch 34. The free end of the main feed-pipe extends nearly to the shoulder 6 and has seated loosely therein a valve 35, which is designed to close the main feed-pipe to the entrance of the fluid fuel when the implement is held in a downward position and to open it to the entrance of the fluid when the implement is held in a reverse or upward position, the valve being prevented from dropping out by the shoulder 6, against which it rests when the implement is held in the latter position.

It will be obvious that when the implement is held with its point in a downward position the flow of the liquid fuel will be through the branch feed-pipe 34 and thence into the main feed-pipe, as the entrance to the latter pipe will be closed by the valve 35; but when the implement is held with its point in an upward direction said valve 35 drops down a sufficient distance to allow the liquid fuel to pass freely into the main feed-pipe and thence direct to the supply-pipe. The main feed-pipe and its branch form an important feature of my invention, as the supply of fuel will be constant, no matter in what position the implement may be held or supported.

Instead of connecting the main feed-pipe with the chamber in the casing 30 I may dispense with said casing and its valve and arrange the said feed-pipe so that the flow of the fuel will be direct to the supply-pipe, as shown in Fig. 7. In this instance the flow of the fuel to the supply-pipe is regulated by a cone-valve 36, attached to the end of the supply-pipe in any well-known manner. The bottom of the chamber is conical to form a seat for the valve 36, and a central aperture or port 37 places said chamber in communication with the main feed-pipe. Fitted into the open end of the chamber 27, which is screw-threaded, is a screw-threaded packing-gland 38, having a smooth bore through which projects the valved end of the supply-pipe. The end of the supply-pipe is provided with suitable ports or openings 39 for the inflow of the liquid fuel. Mounted rigidly on the supply-pipe is a collar 40, and fitting over said collar is a cap or housing 41, internally-screw-threaded to receive the externally-screw-threaded end of a connecting and operating nut 42. The other end of the nut 42 is internally screw-threaded to receive the externally-screw-threaded end of the hub 26, and its outer periphery is provided with corrugations 43 to facilitate the operation of the nut in moving the supply-pipe to and fro to adjust the valve to its seat. When the cap 41 and the nut 42 are screwed together, it will be seen that the collar 40 is firmly confined therebetween, and by unscrewing the nut more or less from the end of the hub the valved supply-pipe may be moved from the seat at the bottom of the chamber 27 without disturbing the relative position of the cap and nut. The screw-threads on said nut being right and left hand, respectively, readily permit the accomplishment of this operation. By turning the nut in the opposite direction, or, in other words, screwing it up, the valved supply-pipe will be forced to its seat to cut off the supply of fuel to said pipe, and consequently to the burner.

A further modification of the feed-pipe is shown in Fig. 8, in which the main pipe is shown extended through the supply-pipe to the burner, and a suitable packing 44, preferably asbestos, is packed around the extended portion of said pipe to keep the supply-pipe cool. The valve for controlling the flow of the fuel to the supply-pipe is dispensed with, and in its stead the end of said extended portion is contracted, as shown at 45, the supply of fuel to the burner being controlled by said contracted end and a needle-valve 46 of the burner 29.

The burner 29 is attached to outer end of the supply-pipe by any suitable and well-known means, preferably by a simple screw-threaded connection 47, as shown in Fig. 2, consisting of a packing-ring 48 and a nut 49. Such a connection has been found in practice to prevent leakage.

The supply-pipe is loosely packed with asbestos, as shown in Fig. 2, which serves the double purpose of a filtering and cooling agent.

In making the burner I prefer to cast it practically solid and drill out the fluid-passage 50, excepting a part of the entrance portion, which may be cored, closing the ends of the drill-holes by plugs 51, as shown in Fig. 2, although it may be constructed like the burner shown in the patents granted to me August 21, 1888, No. 388,187, and September 4, 1894, No. 525,494, respectively, wherein said burner comprises a cylindrical base having an arched passage or pipe, one end of which communicates with the supply-pipe and the other end with the flame-orifice. In the present instance one end of the fluid-passage 50 connects with the supply-pipe and the other end with the flame-orifice, the latter being controlled by the needle-pointed valve 46, operating through a screw-threaded gland 53.

The base of the burner is cut away at opposite sides, as shown at *a*, to receive the arms or lugs *b* of a nozzle 54, and the remaining portions 55 55 are screw-threaded to receive a shield or hood 56, to which may be attached interchangeably various kinds of soldering tools or points—such, for instance, as the soldering-point 57 and the soldering-tool 58, the latter being specially adapted for soldering telegraph and other electric wires. These points or tools are detachably connected to a screw-threaded collar or nut 59, preferably by means of a bayonet joint or connection, and by the collar to the shield or hood, as shown in Figs. 2 and 3. The shield or hood is provided with suitable openings for the escape of the gases and for draft purposes. A connection as above described provides for a ready and quick interchange of tools or points, as each tool or point is formed with a collar 60, having oppositely-disposed lugs 61 61, adapted to enter the slots 62 62 in the collar or nut 59, as shown in Fig. 2ª, and be locked behind the flanges 63 63 when the tool or point is given a slight turn. By screwing the collar or nut tightly up against the end of the shield the tool or point will be held firmly in operative position.

In Fig. 9 I have shown a modified form of burner-nozzle and shield, the two combined in one integral part. The numeral 64 indicates the base portion of the combined nozzle and shield, and 65 the head or shield portion. The base portion is provided with oppositely-disposed lugs 66 66, which are adapted to fit the cut-away portions *a* of the burner, said lugs being formed with outwardly-projecting lips 67 67 for a purpose to be hereinafter described. The outer end of the nozzle portion projects within the shield portion a slight distance beyond the point (*c*) of juncture with the shield.

The outer end 68 of the shield portion is screw-threaded, and a connecting collar or nut 69, similar to collar 59, is employed to attach the various points or tools to said shield. The combined nozzle and shield is connected to the burner by a collar or nut 70, similar to collars 59 and 69, provided with recesses 71 71, adapted to receive the lips 67. The coupling is effected by slightly turning the combined nozzle and shield to set the lips behind the shoulders 72 72 of the collar and then screwing said collar tightly into place.

In order to adapt my soldering implement for use in soldering the caps on cans, I provide a suitable support, consisting of a base 73, a standard or arm 74, having a hollow head 75ª, and a spring-pressed operating-rod 75. To the upper end of the operating-rod is pivoted by a set-screw 76 a bifurcated head 77, to which is bolted a two-part bearing 78, in which the soldering implement is secured, as shown in Fig. 13, with the casing of the valve 46 resting in the bifurcation of the head 77.

The lower end of the operating-rod is enlarged and flattened and provided with a cam-slot 79, in which operates an oval-shaped cam 80, mounted eccentrically on a shaft 81, suitably journaled in the standard 74. The shaft 81 is provided with a band-wheel 82, which is driven from any suitable source of power. The ends of the base are slotted, one being shown at 83, to provide for the attachment of a vertical crank-rod (not shown) to the operating-rod 75 if it should be desired to dispense with the shaft and cams and operate the rod 75 by treadle-power.

In the operation of soldering the caps on cans it is obvious from the foregoing description that the soldering implement will be brought intermittently down to the work, so that the operator will have the free use of both hands to manipulate the cans.

Having thus fully described my invention, what I claim, and desire to secure by Letters Patent, is—

1. In a self-heating soldering implement, the combination with a fuel-reservoir and a supply-pipe, of a main feed-pipe in communication with the supply-pipe, and having a valve in its open end, and a branch feed-pipe intersecting the main feed-pipe, whereby the fuel will be fed through said branch pipe into the main pipe when said valve is closed.

2. In a self-heating soldering implement, the combination with a fuel-reservoir and a supply-pipe, of a main feed-pipe in communication with the supply-pipe, and having a valve in its open end, a branch feed-pipe intersecting the main feed-pipe, whereby the fuel will be fed through said branch pipe, when the valve is closed, and a valve controlling the supply of fuel to the supply-pipe.

3. In a self-heating soldering implement, the combination with a fuel-reservoir and a supply-pipe, of a main feed-pipe in communication with the supply-pipe, and having a valve in its open end, a branch feed-pipe intersecting said main feed-pipe, whereby the fuel will be fed through said branch pipe, when the valve is closed, a valve controlling the flow of fuel to the supply-pipe, and an air-pump in communication with the oil-reservoir.

4. In a self-heating soldering implement, the combination with a fuel-reservoir and a supply-pipe, of a main feed-pipe in communication with the supply-pipe, and having a valve in its open end, a branch feed-pipe intersecting said main feed-pipe, whereby the fuel will be fed through said branch pipe, when the valve is closed, a valve controlling the flow of fuel to the supply-pipe, and a burner.

5. In a self-heating soldering implement, the combination with a fuel-reservoir and a supply-pipe, of a main feed-pipe in communication with the supply-pipe, and having a valve in its open end, a branch feed-pipe intersecting said main feed-pipe, whereby the fuel will be fed through said branch pipe, when the valve is closed, a valve controlling the supply of fuel to the supply-pipe, a burner, and an air-pump communicating with the fuel-reservoir.

6. In a self-heating soldering implement, the combination with a fuel-reservoir, a supply-pipe, and a burner, of a main feed-pipe in communication with the supply-pipe, a valve shutting off the supply of fuel to said feed-pipe when the implement is being used in one position, a branch feed-pipe intersecting the main feed-pipe, whereby the fuel will be fed through said branch pipe, when said valve is closed, a valve controlling the supply of fuel to the supply-pipe, and a valve regulating the flame.

7. In a self-heating soldering implement, the combination with a fuel-reservoir, a supply-pipe, and a burner, of a main feed-pipe in communication with the supply-pipe, a valve shutting off the supply of fuel to the feed-pipe when the implement is used in one position, a branch feed-pipe intersecting the main feed-pipe, whereby the fuel will be fed through said branch pipe, when the valve is closed, a valve controlling the supply of fuel to the supply-pipe, a valve regulating the flame, and an air-pump.

8. In a self-heating soldering implement, the combination with a fuel-reservoir, of a head having a fuel-chamber, a supply-pipe and a main feed-pipe in communication with said fuel-chamber, a valve shutting off the supply of fuel to the feed-pipe when the implement is used in one position, a branch feed-pipe intersecting said main feed-pipe, whereby the fuel will be fed through said branch pipe, when the valve is closed, and a valve controlling the supply of fuel to the supply-pipe.

9. In a self-heating soldering implement, the combination with a fuel-reservoir, of a head having a fuel-chamber, a supply-pipe and a main feed-pipe in communication with said fuel-chamber, a valve shutting off the supply of fuel to the feed-pipe when the implement is being used in one position, a branch feed-pipe intersecting said main feed-pipe, whereby the fuel will be fed through said branch pipe, when said valve is closed, a valve controlling the supply of fuel to the supply-pipe, and an air-pump communicating with the fuel-reservoir.

10. In a self-heating soldering implement, the combination with a fuel-reservoir, of a head having a fuel-chamber, a supply-pipe and a main feed-pipe in communication with said fuel-chamber, a valve shutting off the supply of fuel to the feed-pipe when the implement is being used in one position, a branch feed-pipe intersecting said main feed-pipe, whereby the fuel will be fed through said branch pipe, when the valve is closed, a valve controlling the supply of fuel to the supply-pipe, and a burner.

11. In a self-heating soldering implement, the combination with a fuel-reservoir, of a head having a fuel-chamber, a supply-pipe and a main feed-pipe in communication with said fuel-chamber, a valve shutting off the supply of fuel to the feed-pipe when the implement is being used in one position, a branch feed-pipe intersecting said main feed-pipe, whereby the fuel will be fed through said branch pipe, when said valve is closed, a valve controlling the supply of fuel to the supply-pipe, a burner, and a valve regulating the flame.

12. In a self-heating soldering implement, the combination with a fuel-reservoir, of a head having a fuel-chamber, a supply-pipe and a main feed-pipe in communication with said fuel-chamber, a valve shutting off the supply of fuel to the feed-pipe, when the implement is being used in one position, a branch feed-pipe intersecting said main feed-pipe, whereby the fuel will be fed through said branch pipe, when the valve is closed, a valve controlling the supply of fuel to the supply-pipe, a burner, a valve regulating the flame, and an air-pump.

13. In a self-heating soldering implement, the combination with a fuel-reservoir and a supply-pipe, of a main feed-pipe having one end communicating with the supply-pipe and its other end in communication with the fuel-reservoir, whereby fuel may be fed to the supply-pipe when the implement is being used in one position, a valve shutting off the supply of fuel to the main feed-pipe, and a branch feed-pipe intersecting said main feed-pipe at a point beyond the valve, and having an open end, whereby fuel may be supplied through said branch pipe, to the main feed-pipe and thence to the supply-pipe, when the implement is being used in a different position.

14. In a self-heating soldering implement, the combination with a fuel-reservoir, feed-pipes and supply-pipe, of a burner having oppositely-disposed cut-out portions, a nozzle having arms or lugs adapted to fit said cut-out portions, and means attaching the nozzle to the burner.

15. In a self-heating soldering implement, the combination with a fuel-reservoir, feed-pipes and supply-pipe, of a burner having oppositely-disposed cut-out portions, a nozzle having arms or lugs adapted to enter said cut-out portions, and a shield or hood attaching the nozzle to the burner.

16. In a self-heating soldering implement, the combination with the burner having oppositely-disposed cut-out portions, of a nozzle having arms or lugs adapted to enter the cut-out portions, a shield or hood attaching the nozzle to the burner, point, or tool, and means attaching the point or tool to the shield.

In testimony whereof I affix my signature in the presence of two witnesses.

THEODORE W. EVERSOLE.

Witnesses:
C. M. FORREST,
J. R. NOTTINGHAM.